United States Patent
Arese et al.

(10) Patent No.: US 10,421,689 B2
(45) Date of Patent: Sep. 24, 2019

(54) GYPSUM BOARDS

(71) Applicant: Etex Building Performance International SAS, Avignon (FR)

(72) Inventors: Roger Arese, Isle sur la Sorgue (FR); Pierre Peyron, Sarrlans (FR)

(73) Assignee: Etex Building Performance International SAS, Avignon (FR)

( * ) Notice: Subject to any disclaimer, the term of this patent is extended or adjusted under 35 U.S.C. 154(b) by 18 days.

(21) Appl. No.: 15/575,692

(22) PCT Filed: May 18, 2016

(86) PCT No.: PCT/EP2016/061135
§ 371 (c)(1),
(2) Date: Nov. 20, 2017

(87) PCT Pub. No.: WO2016/188821
PCT Pub. Date: Dec. 1, 2016

(65) Prior Publication Data
US 2018/0290928 A1      Oct. 11, 2018

(30) Foreign Application Priority Data

May 26, 2015   (EP) .................................... 15290137
Feb. 19, 2016  (EP) .................................... 16156444

(51) Int. Cl.
| | | |
|---|---|---|
| C04B 28/14 | (2006.01) | |
| C04B 38/10 | (2006.01) | |
| C04B 14/42 | (2006.01) | |
| E04F 13/08 | (2006.01) | |
| C04B 24/06 | (2006.01) | |
| C04B 24/26 | (2006.01) | |
| C04B 24/38 | (2006.01) | |
| E04C 2/04 | (2006.01) | |
| C04B 111/00 | (2006.01) | |
| C04B 103/30 | (2006.01) | |
| C04B 103/42 | (2006.01) | |

(52) U.S. Cl.
CPC ............ *C04B 28/142* (2013.01); *C04B 14/42* (2013.01); *C04B 24/06* (2013.01); *C04B 24/26* (2013.01); *C04B 24/383* (2013.01); *C04B 28/14* (2013.01); *C04B 38/10* (2013.01); *C04B 38/106* (2013.01); *E04C 2/043* (2013.01); *E04F 13/08* (2013.01); *C04B 2103/34* (2013.01); *C04B 2103/42* (2013.01); *C04B 2111/0062* (2013.01); *C04B 2111/00603* (2013.01)

(58) Field of Classification Search
CPC .......... E04C 2/043; E04F 13/08; C04B 14/42; C04B 24/06; C04B 24/26; C04B 24/383; C04B 28/14; C04B 28/142; C04B 38/10; C04B 38/106; C04B 2103/34; C04B 2103/42; C04B 2111/00603; C04B 2111/0062
See application file for complete search history.

(56) References Cited

U.S. PATENT DOCUMENTS

| | | | |
|---|---|---|---|
| 9,216,927 B2 * | 12/2015 | Hagen | .................... C04B 20/10 |
| 9,802,867 B2 * | 10/2017 | Sudo | ....................... C04B 22/16 |
| 2011/0195241 A1 | 8/2011 | Yu et al. | |
| 2012/0305162 A1 | 12/2012 | Hummel et al. | |
| 2014/0069301 A1 | 3/2014 | Stepp et al. | |
| 2015/0376063 A1 * | 12/2015 | Francis | ................. C04B 28/147 |
| | | | 428/532 |

FOREIGN PATENT DOCUMENTS

| | | | |
|---|---|---|---|
| CA | 2842221 A1 | | 8/1977 |
| CN | 104556925 A | * | 4/2015 |
| GB | 1 226 333 A | | 3/1971 |
| GB | 1481788 A | | 10/1974 |
| WO | 2004052802 A2 | | 6/2004 |
| WO | 2013184376 A1 | | 12/2013 |

* cited by examiner

*Primary Examiner* — Anthony J Green
(74) *Attorney, Agent, or Firm* — Dilworth & Barrese, LLP

(57) ABSTRACT

A gypsum board according to the invention comprises • calcium sulphate dihydrate; • Tartaric acid in an amount in the range of 0.01 to 0.1% w based on the weight of calcium sulphate hemihydrate; • A fluidizer in an amount of 1.0 to 10.0 kg/m³; • Starch in an amount of 3.0 to 12.0 kg/m³.

16 Claims, No Drawings

GYPSUM BOARDS

FIELD OF THE INVENTION

The present invention relates to gypsum boards, methods to provide such boards, and the use of said boards to provide ceilings.

BACKGROUND OF THE INVENTION

Gypsum boards are well known. Gypsum boards used as ceilings have the disadvantage to sag down to some extent when the boards are fixed to supporting members at the sides of the board.

Typically the distance between the axes of such support members (also referred to as span length) is limited to 625 mm, because gypsum boards tend to sag too much when this span length is larger.

SUMMARY OF THE INVENTION

It is an object of the present invention to provide gypsum boards which can be used for span lengths of ceilings of more than 700 mm, more than 750 mm, or even more than 800 mm, such as 900 mm. Preferably the density of the gypsum in the board is more than 0.45 kg/l, such as in the range of 0.45 kg/l to 1 kg/l, more preferably in the range of 0.54 kg/l to 0.65 kg/l.

According to a first aspect of the invention, a gypsum board is provided, which board comprising
  calcium sulphate dihydrate;
  tartaric acid in an amount in the range of 0.01 to 0.1% w based on the weight of calcium sulphate hemihydrate;
  a fluidizer in an amount of 1.0 to 10.0 kg/m$^3$;
  starch in an amount of 3.0 to 12.0 kg/m$^3$.

Gypsum is to be understood as calcium sulphate dihydrate (or $CaSO_4 \cdot 2H_2O$). Calcium sulphate hemihydrate, stucco or plaster is the, typically calcined, calcium sulphate material used to make the gypsum slurry prior to setting of the gypsum. The term "based on the weight of calcium sulphate hemihydrate" is to be understood as the weight ratio of the product over the weight of the calcium sulphate if it were in its chemical form as a hemihydrate ($CaSO_4 \cdot \frac{1}{2}H_2O$).

The reference to kg/m$^3$ refers to the weight of the product per cubic meter of the gypsum board.

It was found that the combination of the gypsum with starch, tartaric acid and a fluidizer in these ranges provide surprisingly low sagging behaviors to the gypsum boards.

The gypsum board described herein typically comprises gypsum as its main component. In particular embodiments, the gypsum board comprises at least 60% w gypsum, preferably at least 70% w gypsum, more preferably at least 85% w gypsum. In particular embodiments, the core comprises from 70% w to 97% w gypsum.

According to some embodiments, the gypsum may be synthetic gypsum. Preferably, the synthetic gypsum is flue gas desulphurization gypsum (FGD), also known as "desulphogypsum" (DSG).

Natural gypsum can also be used, although in this case highly pure gypsum is preferred. Highly pure is to be understood as comprising more than 90% w, or even more than 93% w such as more than 95% w of calcium sulphate dihydrate. The % w are percentages of weight of the sulphate dihydrate over the total weight of the highly pure gypsum. Optionally a mixture of synthetic gypsum and high pure natural gypsum is used.

Preferably the fluidizer is polynaphthalene sulphonate or polymelamine sulphonate. According to some embodiments, the fluidizer may be a polynaphthalene-based fluidizer. More preferably the fluidizer is present in the range of 1.6 to 5.0 kg/m$^3$, more preferably in the range of 2.0 to 4.0 kg/m$^3$.

According to some embodiments, the starch may be fluidified starch, oxidized starch, hydrolysed starch, oxyhydrolysed starch or combinations thereof.

More preferably the starch is fluidified starch and/or oxidized starch

According to some embodiments, the starch may be present in an amount in the range of 4 to 10 kg/m$^3$. More preferably the starch is present in the range of 4 to 9 kg/m$^3$, e.g. in the range of 5.6 to 8 kg/m$^3$.

The gypsum boards described herein comprise tartaric acid. The tartaric acid may comprise the levo- (L), dextro- (D), or meso enantiomeric form; or mixtures thereof. The skilled person will understand that (part of) the tartaric acid may be present in the gypsum boards as a tartaric acid salt. Accordingly, the term "tartaric acid" as used herein may include tartaric acid salts. The references to % w in the present application refer to the total amount of tartaric acid and salts thereof, as if all were in the acid form (i.e. having the basic formula $C_4H_6O_6$).

The tartaric acid may be present in an amount in the range of 0.01 to 0.1% w based on the weight of calcium sulphate hemihydrate, such as in the range of 0.02 to 0.06% w, such as in the range of 0.025 to 0.04% w.

The gypsum boards described herein may be prepared using tartaric acid, tartaric acid salts, or mixtures thereof. The salts may be tartrates (double salt form) and/or bitartrates (single salt form). Exemplary tartaric acid salts include, but are not limited to metallic salts and (quaternary) ammonium salts. Exemplary metallic salts include (di)sodium tartrate and (di)potassium tartrate.

In particular embodiments, the gypsum board is prepared using tartaric acid and without the use of tartaric acid salts. In further embodiments, tartaric acid may be present in an amount in the range of 0.01 to 0.1% w based on the weight of calcium sulphate hemihydrate.

The gypsum boards according to the first aspect of the present invention have the advantage that a sagging of less than 4 mm can be obtained when this sagging is measured according to ASTM C473, using an inter-axis distance of 900 mm.

According to some embodiments, the density of the gypsum in the board may be more than 0.45 kg/l, preferably in the range of 0.45 kg/l to 1 kg/l.

According to some embodiments, the board further may comprise a foaming agent. The amount of foaming agents added may depend on the foaming agent type, and the desired density of the plasterboard to be produced. Preferably, an amount ranging from 0.01% w to 0.1% w (relative to the calcium sulphate hemihydrate) is used.

More preferred, the foaming agent may be tensio-active compounds or surfactants, such as comprising alkylsulphate with general formula $RnOSO_3^-M^+$ where Rn represents linear or branched chain hydrocarbons having an average of n carbon atoms, and M may e.g. be Na, K, magnesium, ammonium or organic derivatives thereof, such as monoethalonamine, diethanolamine or triethalonamine. $M^+$ preferably is sodium ($Na^+$) or ammonium ($NH4^+$). The average number of carbon atoms can be calculated by dividing the total number of carbon atoms of all Rn groups by the total number of Rn groups. In further embodiments, each Rn is a linear $C_{6-16}$alkyl. The mean value of n preferably may be in the range of 10 to 11. The mean value of n more preferably may be in the range of 10.1 to 10.7. In the alternative, mean value for n may be in the range of 9 to 10, with the values of n ranging between 6 and 16. As an example, the surfactants may comprise 5 to 60% w octylsulphate and/or 40 to 95% w of decylsulphate and/or 5 to 60% w of dodecylsulphate.

More preferred, alkylsulphate is of general formula $H(CH_2)_n OSO_3^- M^+$. More preferred, the compounds comprise octylsulphate, decylsulphate, dodecylsulphate or combinations thereof. Octylsulphate is preferably present in an amount less than 30% w.

Dodecylsulphate is preferably present in an amount of 10 to 50% w. Preferably decylsulphate, such as sodium decylsulphate, is present in an amount of 55 to 75% w, dodecylsulphate, such as sodium dodecylsulphate, is present in an amount of 18 to 37% w and octylsulphate, such as sodium octylsulphate, is present in an amount of 0 to 15% w. The above mentioned % w refer to the weight of the component over the total weight of the surfactants.

As an other example, the surfactants may comprise 5 to 25% w octylsulphate, such as sodium octylsulphate, and 75 to 95% w of decylsulphate, such as sodium decylsulphate.

The surfactant or surfactants may be foamed before introducing it into the gypsum slurry.

According to some embodiments, the board further may comprise glass fibers. The glass fibers may be staple fibers. Glass fibers may be added in an amount of 0.4 to 4.8 kg/m$^3$, more preferred in the range of 2 to 3 kg/m$^3$. The glass fibers preferably are of E-glass, having a length of typically about 12 mm.

In specific embodiments, the gypsum board described herein comprises:
calcium sulphate dihydrate;
tartaric acid in an amount in the range of 0.025 to 0.06% w based on the weight of calcium sulphate hemihydrate;
a fluidizer in an amount of 2.0 to 10.0 kg/m$^3$;
starch in an amount of 4.0 to 12.0 kg/m$^3$.

According to a second aspect of the invention, a method for making a gypsum board is provided, which method comprises the steps of
Providing calcium sulphate hemihydrate;
Providing tartaric acid in an amount in the range of 0.01 to 0.1% w based on the weight of calcium sulphate hemihydrate;
Providing a fluidizer in an amount of 1.0 to 10 kg per m$^3$ of slurry;
Starch in an amount of 3.0 to 10.0 kg per m$^3$ of slurry;
Providing an aqueous slurry comprising said calcium hemihydrate, fluidizer, tartaric acid and starch;
Casting said slurry;
setting said slurry to provide a gypsum board.

After the calcium sulphate hemihydrate has set to calcium sulphate dihydrate, the board so obtained may be dried.

According to some embodiments, the starch may be provided in an amount in the range of 4.0 to 10.0 kg per m$^3$ of slurry.

According to some embodiments, the tartaric acid may be present in an amount in the range of 0.02 to 0.06% w based on the weight of calcium sulphate hemihydrate. According to some embodiments, the tartaric acid may be present in an amount in the range of 0.025 to 0.04% w based on the weight of calcium sulphate hemihydrate. The tartaric acid is preferably provided as an aqueous solution of tartaric acid, for example an aqueous solution comprising 40% w of tartaric acid. The term "aqueous" as used herein means that at least 50% w of the solvent is water. Preferably, the solvent is water. As described above, the tartaric acid may be provided as such (i.e. in the acid form); and/or as a tartaric acid salt. In particular embodiments, the tartaric acid is provided as such.

Other ingredients may be used to provide the gypsum slurry, such as accelerators and/or retarders and/or silicone oils or waxes and/or foaming agents and alike.

The gypsum board may be provided with a facer at one or both sides of the board. More preferred, these facers are cellulose based or non cellulose based facers, e.g. facers comprising or even consisting of glass fibers, or combinations of cellulose and glass fibers Boards may have a thickness in the range of 6 to 25 mm, such as in the range of 10 to 18 mm, such as 12.5 mm.

Boards may have a width up to 900 mm, such as up to 1200 or even 1250 mm, e.g 1250 mm, 1200 mm or 900 mm.

According to a third aspect of the invention, the gypsum board may be used to provide a ceiling, wherein the gypsum board is fixed to two support members, said support members having an axis to axis inter-distance of at least 700 mm. The gypsum board is fixed to the two support members in perpendicular direction.

With axis to axis inter-distance is meant the distance between the two axes of the two support members. The skilled person will understand that this refers to two adjacent support members, i.e. no other support members are provided between said two adjacent support members.

According to some embodiments, the gypsum board according to the first aspect, optionally obtained according to a method of the second aspect of the invention, may be used to provide a ceiling, wherein said support members having an axis to axis inter-distance of at least 750 mm. In further embodiments, the support members may have an axis to axis inter-distance of at least 800 mm.

As an example, the gypsum board may be used to provide a ceiling, wherein the support members having an axis to axis inter-distance of at least 900 mm.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description which illustrate, by way of example, the principles of the invention. This description is given for the sake of example only, without limiting the scope of the invention.

DESCRIPTION OF ILLUSTRATIVE EMBODIMENTS

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

Gypsum board according to the invention (ex 1 and ex 2), having a thickness of 12.5 mm, are made by mixing the ingredients as set out in table I into a gypsum slurry. Also a reference gypsum board (ref) of 12.5 mm thickness was made as shown in table I. The FIGURES in table I are expressed as gram per square meter of gypsum board after drying.

TABLE I

| board | Ex 1 | Ex 2 | ref |
| --- | --- | --- | --- |
| Synthetic calcium sulphate hemihydrate | 5246 | 6991 | 7030 |
| Fluidified starch | 100 | 50 | 30 |
| Tartaric acid | 2 | 2 | 0 |
| water | 4462 | 5283 | 5252 |
| Surfactant (sodium alkylsulphate) | 4.6 | 3.3 | 3.5 |
| accelerator | 30 | 28 | 28 |
| retarder | 0.25 | 0.3 | 0.3 |
| fluidizer | 43 | 40 | 30 |

The boards were produced by a standard but identical production process.

This slurry was casted on a standard gypsum board casting machine, using on both sides of the gypsum board a cellulose based or other, non-cellulose based membrane as a facer. The board has a width of about 1250 mm. After curing, this board was tested according to ASTM C473, using an axis to axis inter-distance between the support members of 800 mm. A sagging of only less than 4 mm was measured. This and density property of the boards are set out in table II

TABLE 11

| board | Ex 1 | Ex 2 | ref |
| --- | --- | --- | --- |
| Sagging 800 mm span - acc. ASTM c437 | <3 mm | <3.2 mm | >6 mm |
| Weight (Kg/m$^2$) | 6.7 | 8.7 | 8.7 |

It is to be understood that although preferred embodiments and/or materials have been discussed for providing embodiments according to the present invention, various modifications or changes may be made without departing from the scope and spirit of this invention.

The invention claimed is:

1. A gypsum board comprising
   calcium sulphate dihydrate;
   tartaric acid in an amount in the range of 0.01 to 0.1 wt % based on weight of calcium sulphate in hemihydrate form;
   a fluidizer in an amount of 1.0 to 10.0 kg/m$^3$; and
   starch in an amount of 3.0 to 12.0 kg/m$^3$.

2. A gypsum board according to claim 1, comprising synthetic gypsum.

3. A gypsum board according to claim 1, wherein the fluidizer is a polynaphthalene-based fluidizer.

4. A gypsum board according to claim 1, wherein the starch is fluidified starch, oxidized starch, hydrolysed starch, oxyhydrolysed starch or combinations thereof.

5. A gypsum board according to claim 1, wherein the starch is present in an amount in the range of 4 to 10 kg/m$^3$.

6. A gypsum board according to claim 1, wherein tartaric acid is present in an amount in the range of 0.025 to 0.06 wt % based on the weight of the calcium sulphate in hemihydrate form.

7. A gypsum board according to claim 1, wherein the density of the gypsum in the board is more than 0.45 kg/l.

8. A gypsum board according to claim 1, wherein the board further comprises a foaming agent.

9. A gypsum board according to claim 1, wherein the board further comprises glass fibers.

10. A gypsum board according to claim 7, wherein the density of the gypsum in the board is in the range of 0.45 kg/l to 1 kg/l.

11. A method for providing a ceiling, comprising fixing said gypsum board according to claim 1 to two support members, said support members having an axis to axis inter-distance of at least 700 mm.

12. The method according to claim 11, wherein said support members have an axis to axis inter-distance of at least 750 mm.

13. The method according to claim 11, wherein said support members have an axis to axis inter-distance of at least 800 mm.

14. A method for making a gypsum board comprising the steps of
   providing calcium sulphate hemihydrate;
   providing tartaric acid in an amount in the range of 0.01 to 0.1 wt % based on the weight of calcium sulphate hemihydrate;
   providing a fluidizer in an amount of 1.0 to 10 kg per m$^3$ of slurry;
   providing starch in an amount of 3.0 to 12.0 kg per m$^3$ of slurry;
   providing an aqueous slurry comprising said calcium hemihydrate, fluidizer, tartaric acid, and starch;
   pasting said slurry; and
   setting said slurry to provide a gypsum board.

15. A method according to claim 14, wherein the starch is provided in an amount in the range of 4.0 to 10.0 kg per m$^3$ of slurry.

16. A method according to claim 14, wherein the tartaric acid is present in an amount in the range of 0.025 to 0.06 wt % based on the weight of calcium sulphate hemihydrate.

* * * * *